(12) United States Patent
Looper et al.

(10) Patent No.: US 12,243,150 B1
(45) Date of Patent: Mar. 4, 2025

(54) SYSTEMS AND METHODS FOR REDUCING POINT CLOUD AND TEXTURE DATA USING ADAPTED SPLATTING TECHNIQUES

(71) Applicant: Illuscio, Inc., Culver City, CA (US)

(72) Inventors: Sean Looper, Flagstaff, AZ (US); Thomas Matterson, Breaker Bay (NZ)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/748,830

(22) Filed: Jun. 20, 2024

(51) Int. Cl.
G06T 15/04 (2011.01)
G06T 15/20 (2011.01)
G06T 17/00 (2006.01)

(52) U.S. Cl.
CPC .............. G06T 15/04 (2013.01); G06T 15/20 (2013.01); G06T 17/00 (2013.01); G06T 2210/56 (2013.01)

(58) Field of Classification Search
None
See application file for complete search history.

(56) References Cited

U.S. PATENT DOCUMENTS

2017/0094262 A1 * 3/2017 Peterson ............... G06T 15/205

OTHER PUBLICATIONS

Garcia et al.; "Textured splat-based point clouds for rendering in handheld devices;" Jun. 18, 2015; Web3D '15: Proceedings of the 20th International Conference on 3D Web Technology pp. 227-230 (Year: 2015).*

* cited by examiner

*Primary Examiner* — Peter Hoang
(74) *Attorney, Agent, or Firm* — Ansari Katiraei LLP; Arman Katiraei; Sadiq Ansari

(57) ABSTRACT

An optimization system reduces the data encoded within a point cloud for streaming and/or rendering of a lossy representation of the point cloud. The optimization system generates a first optimized splat for a first visual characteristic of the point cloud by replacing a first set of points having a first common value for the first visual characteristic with a first replacement primitive, and generates a second optimized splat for a second visual characteristic of the point cloud by replacing a second set of points having a second common value for the second visual characteristic with a second replacement primitive. The optimization system provides the first optimized splat and the second optimized splat instead of the original points of the point cloud in response to a request to access the point cloud.

19 Claims, 9 Drawing Sheets

SYSTEMS AND METHODS FOR REDUCING POINT CLOUD AND TEXTURE DATA USING ADAPTED SPLATTING TECHNIQUES

BACKGROUND

A point cloud may be defined with a set of points that are distributed across a three-dimensional space (3D). The set of points form a 3D representation or 3D model of one or more objects, scenes, or environments when rendered in the 3D space at their defined positions with their defined visual characteristics. Million or billions of points may be defined to accurately represent the structures, shapes, visual characteristics, and/or other properties of the 3D representation or the 3D model at a resolution or density that is sufficient to eliminate gaps or other visual discontinuity between the points.

Each point cloud point may be defined with at least a position in the 3D space (e.g., x, y, and z coordinates) and at least one parameter for visually representing the point at the defined position (e.g., color, roughness, transparency, reflectivity, etc.). The parameters or visual characteristics may be mapped to the point cloud points from separate textures or texture files. In any case, the size or amount of data encoded within or associated with a single point cloud may be several orders of magnitude larger than two-dimensional (2D) images or other 3D formats that represent the same 3D representation or 3D model with polygons or meshes that are larger than and span larger regions of space than a single point of the point cloud.

The larger size and greater amount of data stored within a point cloud relative to 2D images and other 3D formats cause point clouds to be a less desirable format for streaming and/or processing. Specifically, greater bandwidth and hardware resources are needed to stream and render a point cloud relative to other formats. Accordingly, there is need to reduce the amount of data that is defined within a point cloud without significant lose in the visual quality.

DETAILED DESCRIPTION OF PREFERRED EMBODIMENTS

Figure 1:
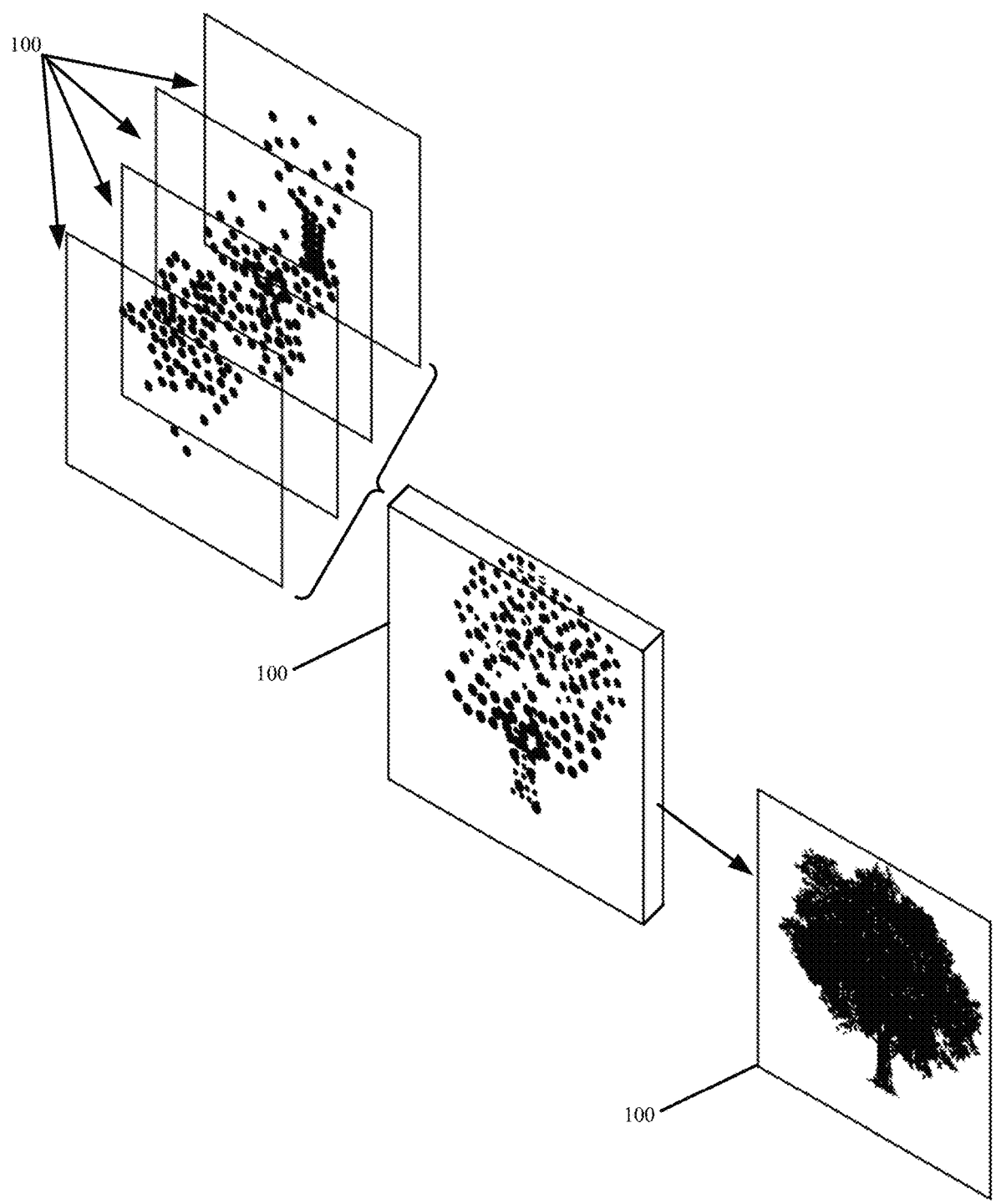
FIG. 1 illustrates an example of an unoptimized or original point cloud in accordance with some embodiments presented herein.

The following detailed description refers to the accompanying drawings. The same reference numbers in different drawings may identify the same or similar elements.

Disclosed are systems and associated methods for reducing point cloud and texture data for three-dimensional (3D) models using adapted splatting techniques. The data reduction involves receiving an unoptimized or original point cloud of a first size, providing the unoptimized or original point cloud as input to one or more neural networks, and generating one or more optimized splats with the neural networks that retain the fidelity or visual quality of the unoptimized or original point cloud by a threshold amount, that collectively have a second size that is less than the first size of the unoptimized or original point cloud, and that are rendered together to form a lossy 3D representation of the unoptimized or original point cloud.

In some embodiments, generating the one or more optimized splats may include using an adapted splatting technique (e.g., an adapted Gaussian splatting technique) to replace a set of points in a given region of the unoptimized or original point cloud with a reduced set of primitives. The reduced set of primitive may include some number of primitives that is less than the points that are replaced by that reduced set of primitives. Each optimized splat is a lossy representation for one or more visual characteristics of the visible surfaces or features from a different view or slice of the unoptimized or original point cloud, wherein the lossy representation is defined with different sets of primitives that are encoded with different visual characteristics of a greater number of points in the corresponding view or slice of the unoptimized or original point cloud.

The primitives within a reduced set of primitives may correspond to a retained subset of points from the unoptimized or original point cloud, points with fixed spherical shapes, points with varying spherical and/or ellipsoidal shapes, and polygonal shapes. The number of primitives used to replace a given set of points may be determined based on the amount of variance found amongst that given set of points for a particular visual parameter or characteristic. For instance, a set of 10 points distributed to form a particular ellipsoidal shape with a uniform reflectivity may be replaced in a first optimized splat generated for the reflectivity parameter with a first primitive that is defined with the particular ellipsoidal shape, that spans the positions of the set of 10 points, and that is defined with the same reflectivity value as each of the set of 10 points. The same set of 10 points may include 7 neighboring points with a first color and 3 neighboring points with a second color that varies from the first color by more than a threshold amount. Accordingly, the set of 10 points may be replaced in a second optimized splat generated for the color parameter with a second primitive that has the shape and spans the positions of the 7 neighboring points and that is defined with the first color, and with a third primitive that has the shape and spans the positions of the 3 neighboring points and that is defined with the second color.

The reduced sets of primitives collectively reconstruct the structure formed by the replaced points and recreate the variance in one or more visual parameters of the replaced points with a threshold or acceptable amount of loss. As explained above, the neural networks may generate a first optimized splat that recreates the reflectivity variance across the points of the unoptimized or original point cloud with a first amount of loss using a first reduced set of primitives, and may generate a second optimized splat that recreates the colors and/or color variance across the points of the unoptimized or original point cloud with a second amount of loss using a second reduced set of primitives. In some embodiments, the optimized splats and the reduced sets of primitives may reduce the size or amount of data for visually recreating the 3D model of the unoptimized or original point cloud by upwards of up to 95% with minimal or imperceptible fidelity or visual quality loss.

An optimization system may control and/or configure the neural networks to generate the one or more optimized splats with different thresholds or acceptable amounts of loss and different numbers of primitives. Consequently, different optimizations of the unoptimized or original point cloud may be generated with different amounts of data reduction and associated quality loss for streaming across data networks with different amounts of available bandwidth and/or for processing by devices with different rendering resources.

A device receiving the optimized splats from the optimization system may reconstruct the 3D model with the threshold or acceptable amount of loss associated with the optimized splats without decompressing the encoded data. In some embodiments, the receiving device reconstructs the 3D model based on an interpolated rendering of two or more optimized splats that are defined with different numbers of primitives and/or differently positioned primitives and that represent a different visual characteristic or parameter of the 3D model. The interpolated rendering may include combining the visual parameter data stored within each of the optimized splats to form a single 3D visualization. In some embodiments, combining the visual parameter data may include attributing the visual parameter data from an optimized splat with fewer primitives to the nearest neighboring primitives of the optimized splat with the most primitives.

FIG. 1 illustrates an example of an unoptimized or original point cloud 100 in accordance with some embodiments presented herein. Point cloud 100 may represent a 3D object or a 3D scene with primitives that correspond to fixed-sized points distributed in a 3D space. The points collectively generate the shape and visual characteristics of the represented 3D object or the 3D scene.

The points of point cloud 100 differ from pixels of a two-dimensional (2D) image because certain regions of point cloud 100 may have no points, lower densities of points, and/or higher densities of points based on varying amounts of visual information that is defined, detected, or scanned at those regions. Additionally, the position of the point cloud points may be defined in a 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected at shared vertices in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D scene in the 3D space.

The positional elements may include one or more values for radii of the point. For instance, the x, y, and z coordinates may specify the center of a spherical point, and a single radius value may define the size of the spherical point that is centered on the specified x, y, and z coordinates. Two or more radii may be defined for an ellipsoid. A different radius may be defined for each of the x, y, and z coordinates to specify a different amount by which the rendered point extends from a center defined by the x, y, and z coordinates.

The positional elements may also include a surface normal. The surface normal defines the angle, direction, or orientation that the surface, feature, or article of the 3D object or the 3D scene represented by the point cloud point faces or is exposed to. More specifically, the surface normal for a particular point is a line, ray, or vector that is perpendicular to the surface, feature, or article represented by that particular point.

The non-positional elements may correspond to parameters for the detected characteristics of the surface, feature, or article imaged at a corresponding position in the 3D space. The characteristics may correspond to a detected color. The color may be represented using red, green, blue (RGB), and/or other values. In some embodiments, the characteristics may provide the chrominance, hardness, translucence, reflectivity, luminance, metallic characteristics, roughness, specular, diffuse, albedo, index of refraction (IOR), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

In some embodiments, one or more of the visual characteristics may be defined separate from the point cloud points in one or more textures or texture files. For instance, different textures may be used to encode the roughness and albedo for different sets of points of the point cloud. The values for the visual characteristics encoded to the textures may be mapped to the points prior to rendering the points and creating a 3D visualization of the points. Shaders and/or other rendering system components may perform the mapping.

Accordingly, each point cloud point may include or may be defined with an array of elements and zero or more textures. The array of elements may provide the positioning of the point in the 3D space as well as one or more parameters for the visual characteristics of that point. The textures may specify other visual characteristics that are not included in the point definition and that may be mapped to the points. In some embodiments, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other non-positional values. In some other embodiments, the point cloud point may be stored and/or represented with positional values and may inherit various visual characteristics from one or more textures defined with the visual characteristics Point cloud 100 and the individual points of point cloud 100 may be generated by a 3D or depth-sensing camera, Light Detection and Ranging (LiDAR) sensor, Magnetic Resonance Imaging (MRI) device, Positron Emission Tomography (PET) scanning device, Computerized Tomography (CT) scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100. Point cloud 100 and the individual points of point cloud 100 may alternatively be digitally created by a graphics artist or other user.

Figure 2:
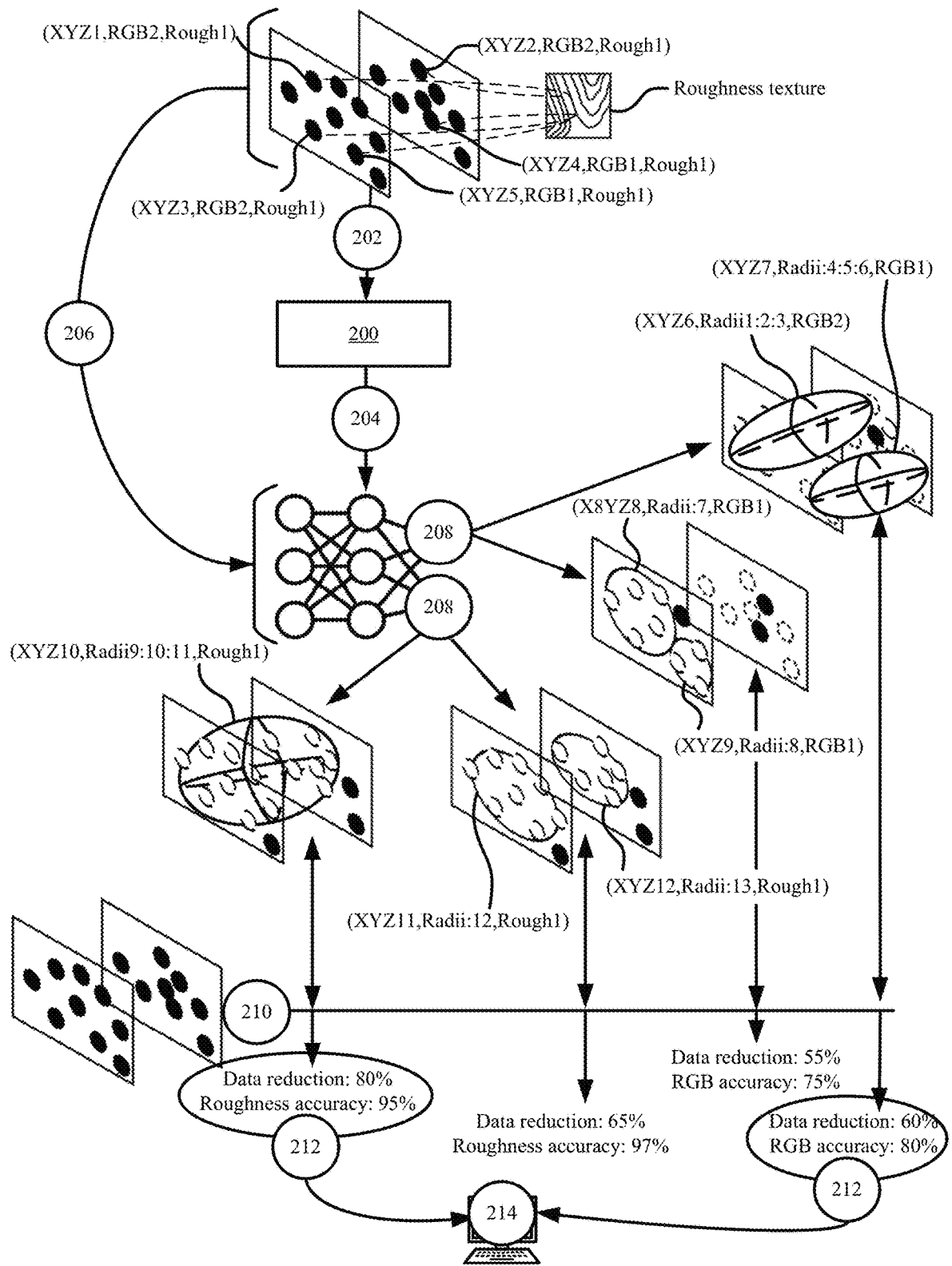
FIG. 2 illustrates an example of optimizing a point cloud based on different variances of different visual characteristics defined across the point cloud data in accordance with some embodiments presented herein.

FIG. 2 illustrates an example of optimizing a point cloud based on different variances of different visual characteristics defined across the point cloud data in accordance with some embodiments presented herein. Optimization system 200 performs the optimization using one or more neural networks.

Optimization system 200 may include one or more devices or machines with processor, memory, storage, network, and/or other hardware resources that reduce the size of a point cloud by generating the one or more optimized splats for the different visual characteristics of the point cloud. In some embodiments, optimization system 200 operates as a server for distributing the optimized splats in response to requests from client devices for access to the unoptimized or original point cloud.

Optimization system 200 receives (at 202) the unoptimized or original point cloud with zero or more associated textures for optimization. In some embodiments, the unoptimized or original point cloud may be one that is generated from scanning a 3D object or scene with a 3D scanning device (e.g., LiDAR, time-of-flight device, etc.), with photogrammetry, or another technique involving a visual capture or imaging of the 3D object or scene. In some other embodiments, the unoptimized or original point cloud is digitally created as an asset for an animation, game, movie, imagery, or other graphical purposes. In any case, the unoptimized or original point cloud is defined with a set of points distributed in a 3D space. Each point is defined with a position in the 3D space and one or more parameters for visual characteristics of the point. Other visual characteristics for the points may be defined in the associated textures and may be mapped to the points according to a shading model or other texture mapping systems and/or techniques.

Optimization system 200 configures (at 204) the one or more neural networks to reduce the size or quality of the point cloud and any associated textures by a specified amount or within maximum and minimum limits. For instance, optimization system 200 may configure (at 204) the one or more neural networks to generate optimized splats that collectively reduce the data encoded to the unoptimized or original point cloud and the associated textures by a set amount, to generate the optimized splats with up to a maximum number of primitives that are less than the number of points defined in the unoptimized or original point cloud, and/or to recreate the 3D model of the unoptimized or original point cloud with a maximum amount of fidelity or visual quality loss (e.g., generate the optimized splats to produce a 3D visualization that does not deviate by more than a threshold amount from the shape and visual characteristics of the 3D visualization produced by the points of the unoptimized or original point cloud).

Optimization system 200 provides (at 206) the unoptimized or original point cloud as input to the configured (at 204) one or more neural networks. Specifically, the one or more neural networks receive the positions and visual characteristics of the points from the unoptimized or original point cloud as input. If one or more of the visual characteristics are defined in one or more textures as opposed to being defined directly in the point definition, optimization system 200 may perform a shading or mapping operation that maps the visual characteristic values from the one or more textures to the points before providing (at 206) the unoptimized or original point cloud as input to the configured (at 204) one or more neural networks. The shading or mapping operation increases the size of the unoptimized or original point cloud by expanding the definition of each point to include values for visual characteristics defined in the textures.

The one or more neural networks generate (at 208) optimized splats with the configured (at 204) amount of data reduction or quality loss using various adapted splatting techniques. The adapted splatting techniques may use Neural Radiance Fields (NeRFs), decimation-based data reduction, and/or other primitive swapping to generate the points and/or primitives of the optimized splats and to achieve the desired data reduction with the desired amount of loss.

The adapted splatting techniques may be based on an existing splatting technique (e.g., Gaussian Splatting) that is modified to receive the unoptimized or original point cloud as input rather than a set of 2D images that capture an object from different views or angles. In other words, the adapted splatting techniques generate the optimized splats based on the 3D positioning of different visual parameters in the 3D space of the unoptimized or original point cloud rather than creating a five-dimensional (5D) coordinate system or radiance field from an aligned set of 2D images. The adapted splatting techniques are also modified to include a 3D rendering pipeline for comparing 3D visualizations of the different visual parameters between the unoptimized or original point cloud and the corresponding one or more optimized splats that are generated for those different visual parameters, and a modified loss function for retraining the neural networks and adjusting the optimized splat generation based on the results of the comparisons.

In some embodiments, the neural networks generate the points or primitives of the optimized splats by removing points from the unoptimized or original point cloud that are partially or wholly obscured by other points with the same or similar visual characteristic, and by replacing different sets of neighboring points that have the same or similar visual characteristic with a single primitive that has the shape or form and the same or similar visual characteristic as the set of neighboring points. In other words, the neural networks analyze the variance of different visual characteristics across the unoptimized or original point cloud, and generate the optimized points clouds that retain different subsets of the points and that replace other subsets of points with primitives of varying shapes.

Optimization system 200 compares (at 210) the generated optimized splats against the unoptimized or original point cloud. In some embodiments, optimization system 200 performs the comparison (at 210) by rendering the different visual characteristic associated with the reduced set of primitives of each generated optimized splat and the corresponding visual characteristic defined for the original points of the unoptimized or original point cloud, detecting an amount of deviation between the rendered visualizations, and using a loss function to quantify the quality difference or fidelity loss between the optimized splats and the unoptimized or original point cloud based on the detected deviations. Optimization system 200 may detect deviation in the form of rendered visualizations (e.g., shape, positioning, structure, etc. generated by the rendered points or primitives) as well as deviation in the one or more rendered visual characteristic (e.g., colors, roughness, reflectivity, transparency, specular, IOR, etc.).

In some embodiments, the neural networks may generate new or different optimized splats when the previously generated optimized splats satisfied the data reduction requirements but resulted in quality or fidelity loss that exceeds a threshold amount or an acceptable amount or when the previously generated optimized splats did not satisfy the data reduction requirements but were within the threshold or acceptable loss amounts. In some other embodiments, the neural networks may generate different optimized splats in order to detect the one or more optimized splats that result in the greatest amount of data reduction, least amount of quality or fidelity loss, or both.

Optimization system 200 selects (at 212) the one or more optimized splats that satisfy the configured requirements for data reduction and/or quality loss or that best satisfy the configured requirements relative to other optimized splats that were generated for the same visual characteristic. In some embodiments, optimization system 200 distributes or streams (at 214) the selected (at 212) one or more optimized splats to a client device that requests the unmodified or original point cloud instead of the unmodified or original point cloud. In some other embodiments, optimization system 200 stores the selected (at 212) one or more optimized splats with an identifier that identifies the data reduction and/or loss associated with the selected (at 212) one or more optimized splats, and repeats the procedure to generate other optimized splats with more or less data reduction and/or more or less loss. For instance, the identifier specifies a percentage of the data reduction, the cumulative file size for the optimized splats, and/or a value that indicates hardware resources, network conditions, devices, and/or other properties that the optimized splats are optimized for.

Figure 3:
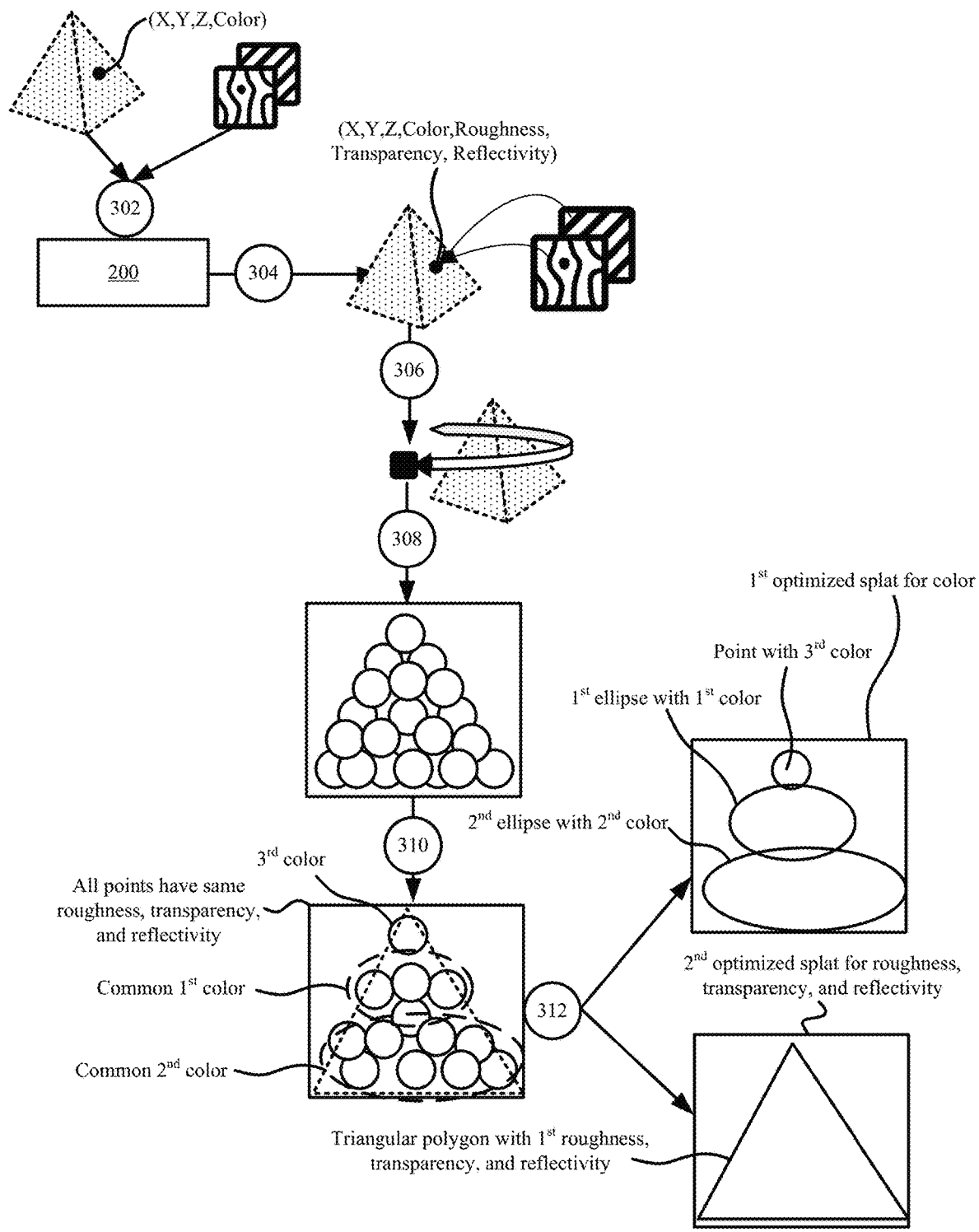
FIG. 3 illustrates an example of reducing data from an unoptimized or original point cloud to an optimized splat in accordance with some embodiments presented herein.

FIG. 3 illustrates an example of reducing data from an unoptimized or original point cloud to an optimized splat in accordance with some embodiments presented herein. Optimization system 200 receives (at 302) the unoptimized or original point cloud with one or more textures that enhance the final visualization of the point cloud by adding one or more visual characteristics to the point cloud points. For instance, the points of the unoptimized or original point cloud may be defined with a position in 3D space and color values. The one or more textures define the roughness, transparency, and reflectivity for the points. The textures may be defined as image files (e.g., jpeg or tiff files) that are encoded with floating point values between 0 and 1. The floating point values may map to a different range of values for a visual characteristic of the point cloud. Optimization system 200 also receives (at 302) a request to optimize or reduce the size of the unoptimized or original point cloud and the one or more textures for streaming over a data network or for processing and/or rendering by one or more devices that may have insufficient hardware resources to render the data from the unoptimized or original point cloud and the one or more textures at a specific frame rate, in an allotted amount of time, and/or at the original resolution.

Optimization system 200 directly incorporates (at 304) the visual characteristics values from the one or more textures into the point definitions and/or the encoding of the unoptimized or original point cloud. Optimization system 200 may use compute shaders or other routines to map coordinates of the one or more textures to coordinates or positions of different sets of points, and to define visual characteristic values for each point of the different sets of points based on mapping of the point position to a position in the texture with an encoded value for the visual characteristic. Consequently, the points of the unoptimized or original point cloud are defined with several different non-positional elements to represent different visual characteristics that were originally part of the point definition or derived from the mapping of the one or more textures. Incorporating (at 304) the visual characteristics values from the textures into the point definitions increases the size of or the amount of data encoded to unoptimized or original point cloud and allows optimized system 200 to discard the textures.

Each non-positional element or visual characteristic may be defined with a different variance. To improve the data reduction and amount of loss associated, optimization system 200 may generate optimized splats for each or combinations of the non-positional elements with similar variances rather than for all non-positional elements in one optimized splat. Accordingly, optimization system 200, by operation of the neural networks, performs a segmented or partitioned adapted splatting that avoids reducing the data for all points and all visual characteristics of the unoptimized or original point cloud at one time.

The segmented or partitioned adapted splatting involves analyzing the variance of individual visual characteristics for different subsets of points within different views or slices of the unoptimized or original point cloud, reducing the data encoding the individual visual characteristics of the subset of points within a single view or slice according to the adapted splatting, and generating an optimized splat for each visual characteristic and each view or slice. The segmented or partitioned adapted splatting maximizes the overall data reduction and minimizes the overall quality and/or fidelity loss by minimizing the variance across the data that is to be reduced. Collectively, the different views or slices provide a 360-degree capture of the unoptimized or original point cloud.

Optimization system 200 may vary the number of views or slices based on desired data reduction and/or quality loss.

For instance, increasing the number of views or slices may increase the number of optimized splats that are generated. However, the additional optimized splats may retain more visual data (e.g., points or primitives with the corresponding visual characteristics) as focus is placed on additional sets of points that are centered in the field-of-view associated with each view or slice, therefore lowering the loss of visual quality or fidelity that accompanies the data reduction.

Optimization system 200 starts the optimization by selecting (at 306) a first view, slice, or perspective of the point cloud to optimize. Optimization system 200 selects (at 308) a first set of points that are rendered as part of the first view, slice, or perspective, and performs the adapted splatting to reduce the data associated with the first set of points in the first view, slice, or perspective.

In some embodiments, the adapted splatting involves a first optimization or data reduction that differentiates unobscured points from obscured points and that removes (at 310) the data of the obscured points from a generated optimized splat. An obscured point may include a point that is wholly or partially obscured in the visualization or rendering of the first view, slice, or perspective by one or more other points that are positioned in front or before the obscured point in the first view, slice, or perspective. Accordingly, even though the obscured points contain as much data as the unobscured points, the obscured points are less visible and contribute less to the overall visualization. In some such embodiments, the neural network may identify the obscured points by comparing the positional elements or positions of the points to detect some amount of overlap or by rendering the points and selecting the points in the rendered visualization that are partially (e.g., more than 50% blocked) or wholly obscured.

In some embodiments, the adapted splatting involves a second optimization or data reduction that replaces (at 312) a set of neighboring points that have common values in one or more of their non-positional elements with the definition of a single primitive. For instance, the neural networks may identify two or more points that are positioned adjacent to one another and that are defined with the same or similar values for color, roughness, reflectivity, and/or another non-positional element and that may be replaced with a single primitive. Similar values for a non-positional element may include values that deviate by less than a threshold amount from one another or from a median value. The neural networks define the replacement primitive to span the positions of the two or more points being replaced.

The replacement primitive may have a configurable or modifiable shape. The shape of the replacement primitive may be defined with a position in the 3D space of the point cloud and with one or more radius values or with multiple positions to define vertices of a polygonal primitive.

In some embodiments, the replacement primitive may be defined as a spherical point with a larger radius than each of the two or more points that it replaces when the two or more points are positioned around or adjacent to one another. In some other embodiments, the two or more points may be positioned irregularly or with a non-spherical arrangement. In some such embodiments, the replacement primitive may be defined as an ellipsoid with an x, y, and z coordinate that centers the ellipsoid about the center of the two or more points being replaced, and with two or more radii defining the direction and distance about which the ellipsoid extends in one or more planes or coordinates to span the positions of the two or more points. Similarly, a polygonal primitive may be defined with the three or more vertices to span the region or positions of the two or more points being replaced.

As shown in FIG. 3, regions of the point cloud that have more variance in the non-positional elements of the points have less commonality in the non-positional elements of the points, and are therefore represented with more smaller-sized replacement primitives than regions of the point cloud that have less variance and more commonality in the non-positional elements of the points. In other words, a greater data reduction may be achieved in the regions with less variance because a larger number of neighboring points having the same commonality may be replaced with a single replacement primitive than the regions with greater variance.

In some embodiments, the second optimization (e.g., replacing two or more neighboring points with a replacement primitive) may be performed after the first optimization (e.g., culling obscured points). In some other embodiments, the second optimization may be performed without performing the first optimization. For instance, the second optimization may be performed to define replacement primitives that account for the coloring and/or other non-positional elements or visual characteristics of two or more points that are positioned next to each other and that may overlap with one another.

The neural networks may generate multiple different optimized splats for the same visual characteristic in the same view, slice, or perspective. Specifically, the neural networks may define different replacement primitives with different shapes and different positions to replace different subsets of the points in that view, slice, or perspective, and may execute a loss function to determine the difference between the visualization created by each generated optimized splat and the visualization created by the original points in that view, slice, or perspective of the unoptimized or original point cloud.

Using the loss function, optimization system 200 may determine which optimized splats maximize or yield a desired amount of data reduction with a minimal amount or acceptable amount of loss for the corresponding view, slice, or perspective. For instance, optimization system 200 compares the data reduction and loss associated with each of the different optimized splats generated for a particular visual characteristic and a particular view in order to select and retain the optimized splat that yields the greatest or desired amount of data reduction with the least loss for the particular visual characteristic and the particular view.

Figure 4:
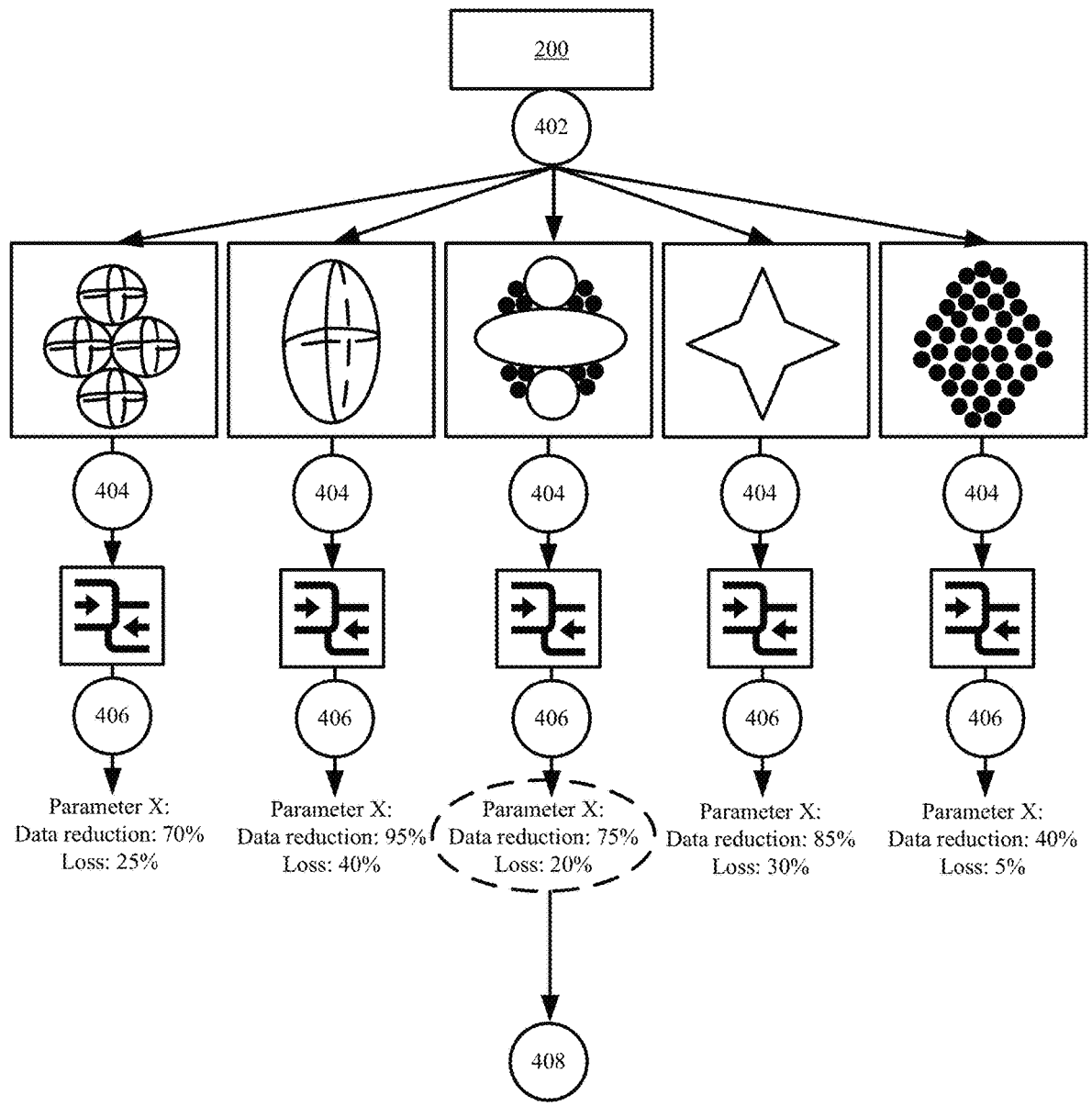
FIG. 4 illustrates an example of selecting between different optimized splats based on a data reduction and loss comparison in accordance with some embodiments presented herein.

FIG. 4 illustrates an example of selecting between different optimized splats based on a data reduction and loss comparison in accordance with some embodiments presented herein. Optimization system 200 uses the neural networks to generate (at 402) a set of optimized splats that provide different reductions of the data for a particular visual characteristic in the same field-of-view of an unoptimized or original point cloud. Although not shown in FIG. 4, the neural networks may generate different optimized splats in order to reduce the data for other visual characteristics in the same field-of-view and the data for visual characteristics in other fields-of-view.

Each optimized splat from the set of optimized splats generated for a particular field-of-view has different retained points or replacement primitives for representing the particular field-of-view. For instance, a first optimized splat may replace a neighboring set of 10 points with a single replacement primitive, a second optimized splat may replace the same neighboring set of 10 points with two replacement primitives, and a third optimized splat replace 7 points from the neighboring set of 10 points with a replacement primitive, retain two of three remaining points, and remove the last of the three remaining points. Accordingly, each optimized splat has a different size or amount of data reduction and is associated with a different amount of loss in visual quality or fidelity relative to the visualization created by the original neighboring set of 10 points.

Optimization system 200 enters (at 404) each of the generated optimized splats for the particular field-of-view into a loss function. The loss function determines (at 406) the data reduction and loss associated with each optimized splat relative to the original set of points that define the particular field-of-view in the unoptimized or original point cloud.

In some embodiments, the loss function determines the data reduction by comparing the amount of data (e.g., number of bits, number of defined primitives, etc.) in each optimized splat relative the amount of data contained by the original set of points that define the particular field-of-view in the unoptimized or original point cloud. In some embodiments, the loss function determines the data reduction by comparing the amount of data contained in each of the different optimized splats. The data reduction may be specified as a percentage, data quantity (e.g., 5 megabytes), or other value.

In some embodiments, the loss function determines the loss associated with each optimized splat by rendering a visualization for the particular visual characteristic represented by the optimized splat in the particular field-of-view and by comparing the visualization against a visualization for the same particular visual characteristic created by the original set of points that define the particular field-of-view in the unoptimized or original point cloud. Comparing the visualizations may include determining positional or structural deviations in the rendered visualizations (e.g., differences in the forms created by the points or primitives) as well as visual characteristic differences between the visualizations. For instance, the colors of a first optimized splat may differ from the colors of the unoptimized visualization by a first amount across the entire field-of-view and the colors of a second optimized splat may differ from the colors of the unoptimized visualization by a second amount at a specific region of the unoptimized visualization. The loss function quantifies the detected differences into a numeric value. The quantified value may be based on the amount of the detected difference in values and the size or region of the particular field-of-view spanned by the difference. For instance, a specific color difference that is isolated in a small region of the particular field-of-view contributes less to the loss computation than the same specific color difference that spans a larger region of the particular field-of-view.

Optimization system 200 selects (at 408) and retains the optimized splat that is determined based on the outputs of the loss function to provide the greatest data reduction with the least amount of loss, and may discard the other optimized splats. In some embodiments, the selection (at 408) of the optimized splat may be weighted more heavily to maximizing data reduction or minimizing loss. For instance, optimization system 200 may be configured to generate an optimized splat that achieves a 30% data reduction relative to the unoptimized or original point cloud. The loss function may determine a first optimized splat yields a 35% data reduction with a 10% quality loss and a second optimized splat yields a 30% data reduction with a 7% quality loss. In this example, optimization system 200 may select and retain the second optimized splat over the first optimized splat despite the first optimized point providing a better data reduction to loss ratio because the second optimized splat provides the threshold data reduction with less loss than the first optimized splat.

Figure 5:
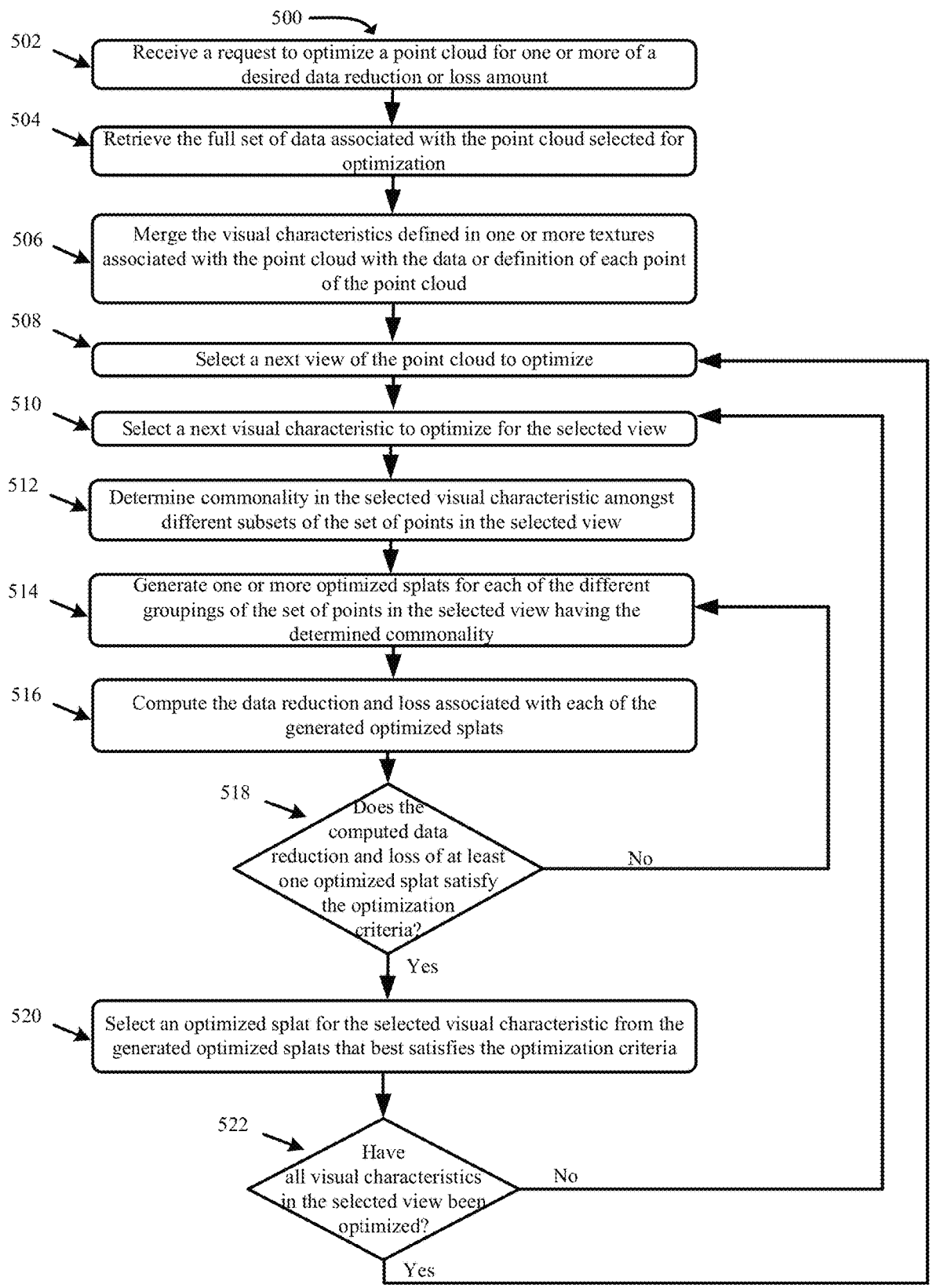
FIG. 5 presents a process for generating optimized splats for different visual characteristics or non-positional elements of point cloud points in accordance with some embodiments presented herein.

FIG. 5 presents a process 500 for generating optimized splats for different visual characteristics or non-positional elements of point cloud points in accordance with some embodiments presented herein. Process 500 is implemented by optimization system 200.

Process 500 includes receiving (at 502) a request to optimize a point cloud for one or more of a desired data reduction or loss amount. For instance, the request may specify an amount or percentage by which to reduce the size of the point cloud and/or an acceptable or threshold amount of loss for the optimization. The optimization criteria may be manually specified by a user or may be automatically selected by optimization system 200. In some embodiments, optimization system 200 automatically generates the request with different optimization criteria in order to generate different optimized versions of the point cloud with different amounts of data reduction and/or loss for streaming over data networks with different performance (e.g., bandwidth, congestion, packet loss, latency, etc.) or for processing by devices with different processing or rendering resources. For instance, optimization system 200 may generate a first request to reduce the data of the point cloud by 20% and a second request to reduce the data of the point cloud by 40%, wherein the first request optimizes the point cloud for transmission over Fifth Generation (5G) wireless data networks and the second request optimizes the point cloud for transmission over Fourth Generation Long-Term Evolution (4G LTE) data networks.

Process 500 includes retrieving (at 504) the full set of data associated with the point cloud selected for optimization. The full set of data may include the data associated with the points defined in the point cloud. The point data may include the coordinates for the point positions in the 3D space of the point cloud and one or more visual characteristics that are also specified in the point data or each point definition. The full set of data may also include one or more textures that store a mapping of other visual characteristic values for the points of the point cloud.

Process 500 includes merging (at 506) visual characteristics defined in one or more textures associated with the point cloud with the data or definition of each point of the point cloud. Merging (at 506) the visual characteristics may include using a shading system to map the visual characteristics from the coordinates of each texture to the coordinates of the point cloud points.

The merging (at 506) incorporates all the visual characteristics from the different textures into a single dataset represented by the point definitions (e.g., the points of the point cloud). In other words, the merging (at 506) encodes the points of the point cloud with the complete positional and visual characteristic data of the 3D model represented by the point cloud.

Process 500 includes selecting (at 508) a view of the point cloud to optimize. The view selection (at 508) may be randomized or performed programmatically until a sufficient number of views are selected to visualize the entirety of point cloud. The view selection (at 508) involves determining a field-of-view or render position at which to optimize the point cloud. In other words, rather than optimize the entire point cloud and all points in the point cloud at one time, optimization system 200 selects (at 508) different regions or subsets of the point cloud to optimize at different times. Selecting (at 508) the view includes selecting a set of points from the point cloud with positions inside the selected (at 508) view. In some embodiments, selecting (at 508) the view includes setting a virtual camera or render position in the 3D space of the point cloud with an orientation that is directed towards a set of points and/or defining a render frustum with a near plane and far plane or with a set of coordinates that specify the boundaries of the field-of-view.

Process 500 includes selecting (at 510) one or more visual characteristics to optimize for the selected (at 508) view. Selecting (at 510) the one or more visual characteristics includes selecting one or more of the non-positional elements that are defined for each point in the set of points falling within the selected (at 508) view for optimization. The visual characteristics available for selection may include an individual color component, a combined color value (e.g., red, green, and blue), chrominance, hardness, translucence, reflectivity, luminance, metallic characteristics, roughness, specular, diffuse, albedo, IOR, or another defined non-positional element of the points. Optimization system 200 may determine which visual characteristics to select based on the variance with which those visual characteristics are defined in the selected (at 508) view. For instance, different visual characteristics that have the same variance (e.g., a fixed non-changing value) may be optimized together since the visual characteristics may be defined for the same reduced set of primitives.

Process 500 includes determining (at 512) commonality in the selected (at 510) visual characteristic amongst different subsets of the set of points in the selected (at 508) view. For instance, optimization system 200, by execution of a neural network, analyzes the variance of the selected (at 510) visual characteristic amongst the set of points in the selected (at 508) view, and selects different groupings of neighboring points that have the same or similar values (e.g., less than a threshold deviation) defined for the selected (at 510) visual characteristic. The different groupings may include a first grouping of neighboring points that have the same defined value for the selected (at 510) visual characteristic, a second grouping of neighboring points in which the values for the selected (at 510) visual characteristic differ by less than 5%, and a third grouping of neighboring points in which the values for the selected (at 510) visual characteristic differ by less than 5% and the neighboring points have a specific arrangement or positioning (e.g., are positioned around one another in a spherical formation, are positioned vertically above or below one another in a particular axis, are positioned according to one of several ellipsoidal shapes, etc.). In other words, the neural network may select different groupings to match the shapes that may be defined with different replacement primitives (e.g., ellipses, polygons, etc.). In some embodiments, optimization system 200 or the neural networks perform different passes through the set of points to select the different groupings or subset of points with the determined (at 512) commonality.

Process 500 includes generating (at 514) one or more optimized splats for each of the different groupings of the set of points in the selected (at 508) view having the determined (at 512) commonality. The optimized splat is generated (at 514) according to one or more of the described optimizations or adapted splatting techniques that receive points of a point cloud as input and that generate the optimized splat with a reduced set of points and/or replacement primitives that represent the form and visual characteristics of the points in the selected (at 508) view with less data. For instance, a group of points with little variance and/or a detected (at 512) commonality may be decimated to remove obscured points in the that group and/or reduce the density of the points in that group. Alternatively, or additionally, two or more points in the group of points may be replaced with a replacement primitive that has the shape and spans the positions of the two or more points and that is defined with a single value for the visual characteristic commonality shared by the two or more points. In some embodiments, generating (at 514) the one or more optimized splats includes defining a primitive with an x, y, and z position and one or more radii that spans the positions of the greatest number of points with a determined (at 512) commonality, and defining the primitive with a single value to represent the determinized (at 512) commonality for the selected (at 510) visual characteristic. The primitive replaces the points in the definition of the optimized splat.

Process 500 includes computing (at 516) the data reduction and loss associated with each of the generated (at 514) optimized splats. In some embodiments, optimization system 200 enters each of the generated (at 514) optimized splats and the original set of points in the selected (at 508) view with the selected (at 510) visual characteristic to a loss function. The loss function computes (at 516) the data reduction and loss by comparing the data defining the selected (at 510) visual characteristic in each optimized splat to the data defining the selected (at 510) visual characteristic of the original set of points and by quantifying the differences in the visualizations created by each optimized splat and the original set of points.

Process 500 includes determining (at 518) whether the computed (at 516) data reduction and loss associated with at least one of the optimized splats satisfies the optimization criteria from the received (at 502) request. Specifically, optimization system 200 determines (at 518) whether the data reduction and loss associated with at least one of the optimized splats is within a threshold or acceptable range specified for the optimization.

In response to determining (at 518—No) that the data reduction and loss associated with the optimized splats does not satisfy the optimization criteria, process 500 includes generating (at 514) new optimized splats based on different groupings of points with shared commonality in the selected (at 510) visual characteristic. In some embodiments, optimization system 200 may adjust the optimization criteria (e.g., to allow for greater loss) or modify the commonality used to generate the groupings of points for optimization before generating the new optimized splats in response to the previously generated (at 514) optimized splats differing from the optimization criteria by more than a threshold amount.

In response to determining (at 518—Yes) that the data reduction and loss associated with the at least one optimized splat satisfies the optimization criteria, process 500 includes selecting (at 520) a particular optimized splat for the selected (at 510) visual characteristic from the generated (at 514) optimized splats that best satisfies the optimization criteria. The particular optimized splat may correspond to the optimized splat that has the greatest data reduction to loss ratio or the optimized splat that achieves the specified amount of data reduction in the optimization criteria with the least amount of loss.

Process 500 may repeat in order to optimize the point cloud for each visual characteristic. Accordingly, process 500 includes determining (at 522) if all visual characteristics for the selected (at 518) view have been optimized. In response to determining (at 522—No) that additional visual characteristics or non-positional elements have yet to be optimized, process 500 includes selecting (at 510) a next or different visual characteristic to optimize for the selected (at 508) view. In response to determining (at 522—Yes) that the visual characteristics of the points in the selected (at 508) view have been reduced with an acceptable amount of loss, process 500 changes (at 508) the view and optimizes the visual characteristics for the next set of points in the changed view according to the optimization criteria. Process 500 repeats until optimized splats have been generated for a complete visualization of the point cloud from any view or angle.

In some embodiments, the optimization criteria against which the optimized splats are generated is defined for the entire point cloud. In some such embodiments, rather than optimize each visual characteristic in each selected view to the optimization criteria, optimization system 200 may allow the optimization for certain visual characteristics in certain views to not satisfy the optimization criteria when there is lots of variance in the certain visual characteristics in the certain views, and may optimize other visual characteristics in other views in excess of the optimization criteria when there is low variance in the visual characteristics in the other views. The cumulative data reduction and/or loss for the optimized splats generated for the different visual characteristics and the different views must then satisfy the optimization criteria that is defined for the entire point cloud. For instance, optimization system 200 may be configured to reduce the point cloud data by 20% and may achieve a 10% reduction in a first region of high variance and a 30% reduction in a second region of low variance to realize a 20% overall reduction.

Figure 6:
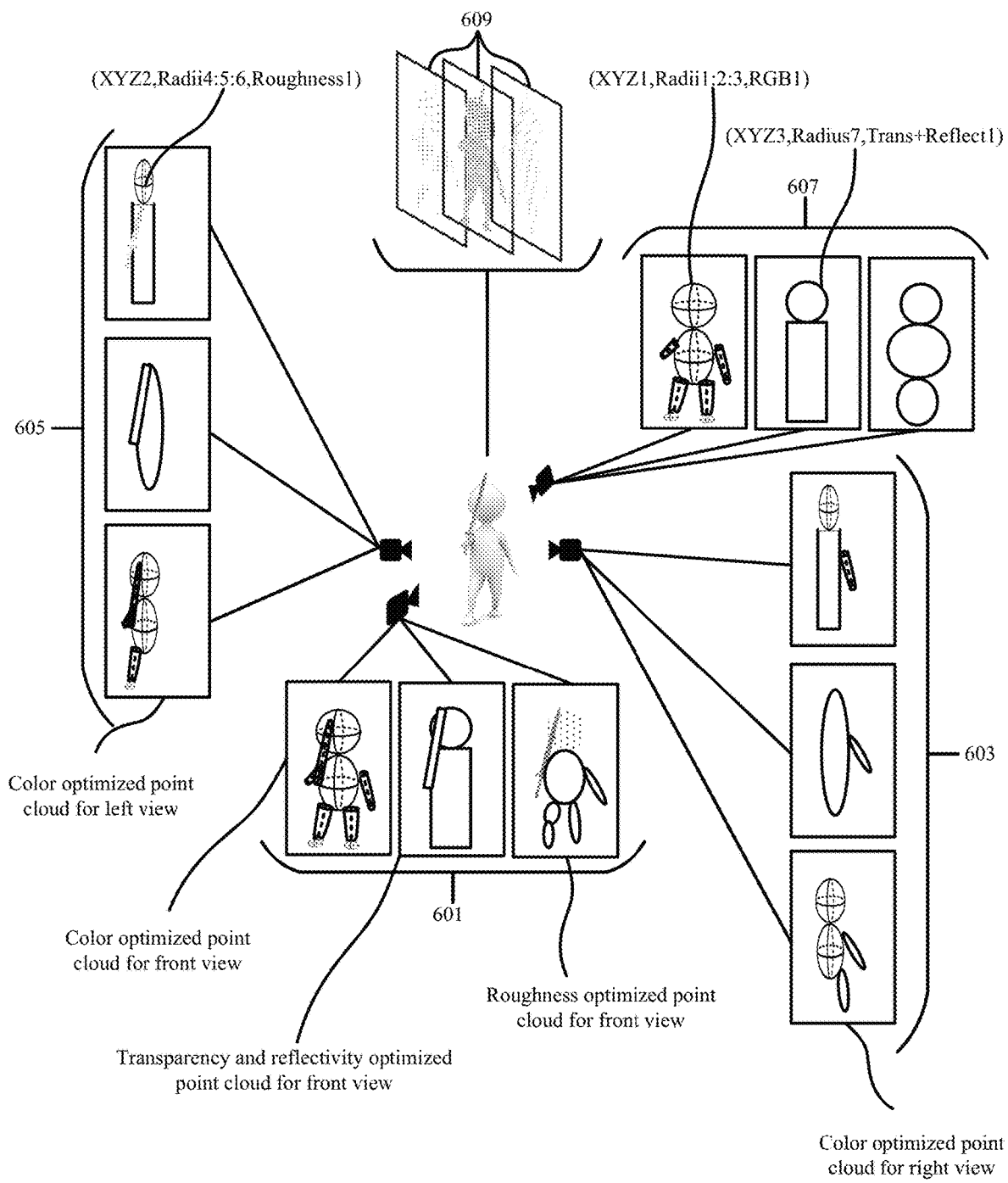
FIG. 6 illustrates an example of different optimized splats that are generated for different visual characteristics and different views of an original point cloud in accordance with some embodiments presented herein.

FIG. 6 illustrates an example of different optimized splats that are generated for different visual characteristics and different views of an original point cloud in accordance with some embodiments presented herein. Different sets of optimized splats 601, 603, 605, and 607 are generated and stored for front, right, left, and back views of original point cloud 609. Different sets of optimized splats 601, 603, 605, and 607 collectively recreate a 360-degree visualization of point cloud 609 with different data reductions and quality loss for different visual characteristics in each view.

The set of optimized splats for each view may include a different point cloud that is optimized for a different visual characteristic or combination of visual characteristics. For instance, each of the different sets of optimized splats 601, 603, 605, and 607 may include a first optimized splat that reduces the amount of data used to represent color based on the color variation across the points in that view, a second optimized point that reduces the amount of data used to represent transparency and reflectivity based on a combined variation of these two visual characteristics across the points in that view, and a third optimized point that reduces the amount of data used to represent roughness based on the roughness variation across the points in that view. Each optimized splat for a particular view may have a different number of primitives, differently positioned primitives, and different shaped primitives that are defined based on the positioning of the commonality detected for the visual characteristic that is optimized by that point cloud.

The optimizations described herein reduce the amount of data within a point cloud without compression. As such, the points within each of the optimized splats may be directly rendered without decompression. However, when different optimized splats are created for different visual characteristics and the different optimized splats are defined with different numbers of primitives with different shapes and/or at different positions, the resulting visualization that combines the visual characteristics may be mismatched, segmented, or offset. Accordingly, an interpolation technique may be performed by a device receiving the optimized splats to render or present the visual characteristics from the different optimized splats on a common or same set of primitives.

Figure 7:
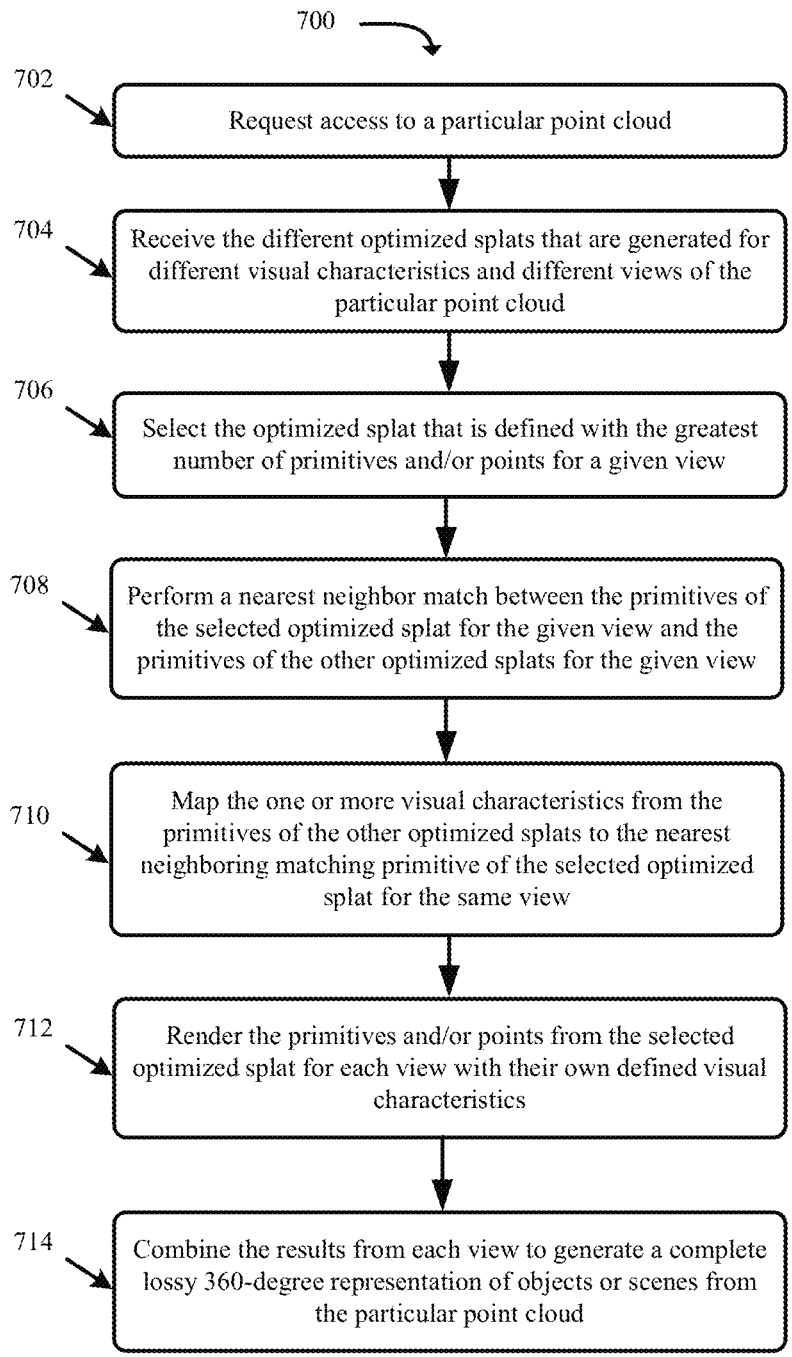
FIG. 7 presents a process for rendering a 3D visualization from the different sets of optimized splats in accordance with some embodiments presented herein.

FIG. 7 presents a process 700 for rendering a 3D visualization from the different sets of optimized splats in accordance with some embodiments presented herein. Process 700 is implemented by a device that generates 3D visualizations or graphics from the optimized splats. The device may include a computer, laptop, tablet, smartphone, or other user device with 3D rendering capabilities. In some embodiments, the device is a gaming appliance for rendering and playing 3D games or a streaming device for watching 3D movies, animations, or other visualizations.

Process 700 includes requesting (at 702) access to a particular point cloud. The request may be issued from a client device to optimization system 200 over a data network. Alternatively, the request may be issued to a file system with access to memory or storage devices on which the particular point cloud is stored. The particular point cloud may correspond to a 3D model or be part of a 3D game, animation, video, or other content.

Process 700 includes receiving (at 704) the different optimized splats that are generated for different visual characteristics and different views of the particular point cloud. For instance, the device may receive (at 704) a first optimized splat with a first set of primitives that are defined with a first visual characteristic (e.g., color) for a first view of the particular point cloud, a second optimized splat with a different second set of primitives that are defined with a second visual characteristic (e.g., roughness, transparency, or reflectivity) for the first view of the particular point cloud, a third optimized splat with a third set of primitives that are defined with the first visual characteristic for a second view of the particular point cloud, and a fourth optimized splat with a fourth set of primitives that are defined with the second visual characteristic for the second view of the particular point cloud. Collectively, the received set of optimized splats produce a lossy 3D reproduction of the particular point cloud.

Process 700 includes selecting (at 706) the optimized splat that is defined with the greatest number of primitives and/or points for a given view. The selected (at 706) optimized splat corresponds to the optimized splat with the highest resolution for the given view and/or the most detail. In some embodiments, optimization system 200 may send the positions (e.g., x, y, and z coordinates) for the original points of the requested point cloud without the original visual characteristics, and the selection (at 706) involves selecting the points that are within the given view. In some such embodiments, the receiving device maps the visual characteristics from the reduced set of primitives in the optimized splats to the original set of points.

Process 700 includes performing (at 708) a nearest neighbor match between the primitives of the selected (at 706) optimized splat for the given view and the primitives of the other optimized splats for the given view. The nearest neighbor match identifies which primitives or points from the other less-dense optimized splats are closest to which primitives or points from the selected (at 706) more-dense optimized splat when the primitives or points are positional misaligned or offset. In some cases, two or more primitives from the higher resolution selected (at 706) optimized splat may be nearest neighbor matches for a single primitive from a lower resolution optimized splat.

In some embodiments, the nearest neighbor matching is performed via tree traversals. In some such embodiments, each optimized splat may be represented as a K-Dimensional (KD) tree or other tree structure (e.g., binary tree, octree, etc.) with the nodes at different layers of the tree representing different regions of the 3D space encompassed by the optimized splat and with the leaf nodes of the tree corresponding to one or more primitives. The nearest neighbor matching may therefore involve traversing down the different paths or branches of each tree representing the different optimized splat, and identifying the leaf nodes or primitives that are defined within each tree for corresponding regions of space.

Process 700 includes mapping (at 710) the one or more visual characteristics from the primitives of the other optimized splats to the nearest neighboring matching primitive of the selected (at 706) optimized splat for the same view. For instance, the optimized splat with the highest resolution for a given view may be defined with only a transparency non-positional element. Color, reflectivity, roughness, and other visual characteristics that have a lower variance or greater commonality in that given view are then mapped and assigned to the primitives of the highest resolution optimized splat from primitives of the other optimized splats created for the given view based on the nearest neighbor matching. In some cases, the mapping may include assigning the same visual characteristic from a single primitive of a lower resolution optimized splat to two or more nearest neighbor matching primitives of the selected (at 706) highest-resolution optimized splat. A similar mapping (at 710) based on the nearest neighbor matching may be performed when the positions of the original points are received without all or some of the visual characteristics that are stored in the optimized splats.

Process 700 includes rendering (at 712) the primitives and/or points from the selected (at 706) optimized splat for each view with their own defined visual characteristics, and the mapping (at 710) visual characteristics of the other optimized splats, and combining (at 714) the results from each view to generate a complete lossy 360-degree representation of objects or scenes from the particular point cloud. Specifically, each of the selected (at 706) optimized splats produces a visualization for a different part of the complete 3D visualization, and combining (at 714) the results includes stitching the visualizations seamlessly together to present the 3D visualization. In some embodiments, the optimized splats for each view are associated with an identifier that identifies a position in the 3D space of the particular point cloud from which the view is captured or generated. Using the identifier, the device is able to correctly position each of the visualizations relative to one another in a 3D space to recreate the complete 3D visualization.

Figure 8:
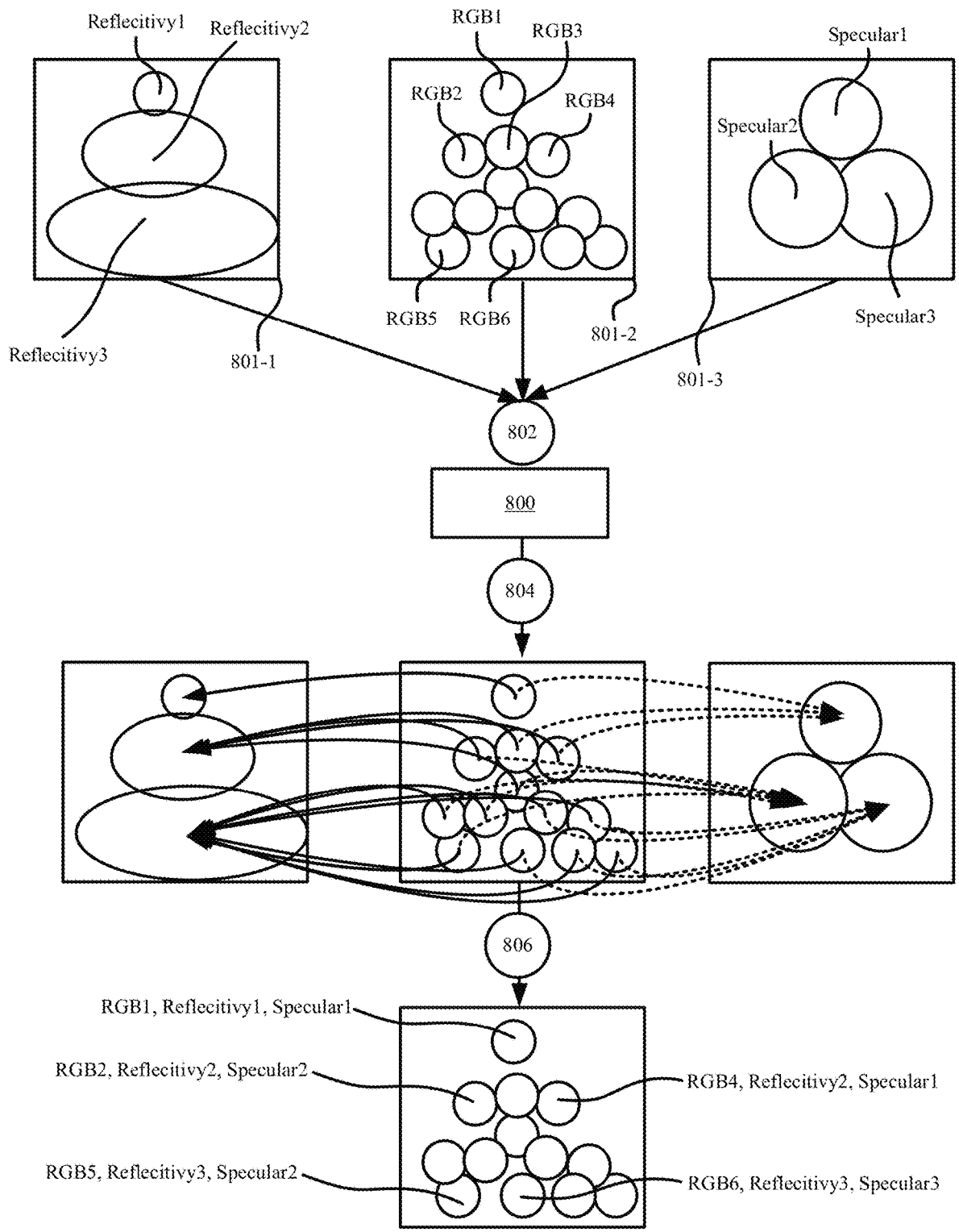
FIG. 8 illustrates an example of the nearest neighbor matching for rendering the optimized splats in accordance with some embodiments presented herein.

FIG. 8 illustrates an example of the nearest neighbor matching for rendering the optimized splats in accordance with some embodiments presented herein. Client device 800 receives (at 802) three optimized splats 801-1, 801-2, and 801-3 (hereinafter individually referred to as "optimized splat 801" and collectively referred to as "optimized splats 801") for a particular view.

Each optimized splat 801 is defined with a different reduced set of primitives and a different visual characteristic encoded to the reduced set of primitives. Specifically, optimized splat 801-1 encodes reflectivity values to a first set of reduced primitives, optimized splat 801-2 encodes color to a second set of reduced primitives, and optimized splat 801-3 encodes specular values to a third set of reduced primitives.

Client device 800 determines that optimized splat 801-2 is defined at the highest resolution and/or the greatest number of primitives. For instance, optimized splat 801-2 may be generated by removing points from the original point cloud that are obscured in the given view, whereas optimized splats 801-1 and 801-3 are defined with fewer larger primitives.

Accordingly, client device 800 performs the nearest neighbor matching (at 804) relative to the points or primitives of optimized splat 801-2. The nearest neighbor matching (at 804) includes comparing the positions of the primitives from optimized splat 801-2 to the positions of the primitives in optimized splat 801-1 and optimized splat 801-3, and determining which primitives from optimized splat 801-2 are positioned closest to which primitives of optimized splat 801-1 and optimized splat 801-3. In some embodiments, the nearest neighbor matching (at 804) involves aligning or overlaying optimized splats 801-1 and 801-3 onto or over optimized splat 801-2. In some other embodiments, the nearest neighbor matching (at 804) is performed by traversing tree-based representation of optimized splats 801.

Client device 800 maps (at 806) the visual characteristic values from primitives of optimized splats 801-1 and 801-3 to nearest neighbor matching primitives of optimized splat 801-2. In this example, the mapping (at 806) includes assigning or adding the reflectivity and specular values from optimized splats 801-1 and 801-3 to primitives of optimized splat 801-2.

Client device 800 performs a similar mapping for the optimized splats for different views of the original point cloud. Client device 800 renders a visualization from the mapped optimized splat of each view, and positions the visualizations in a 3D space according to an identifier or positioning for the corresponding view in order to generate a combined or complete 3D visualization that is lossy representation of the original point cloud.

Figure 9:
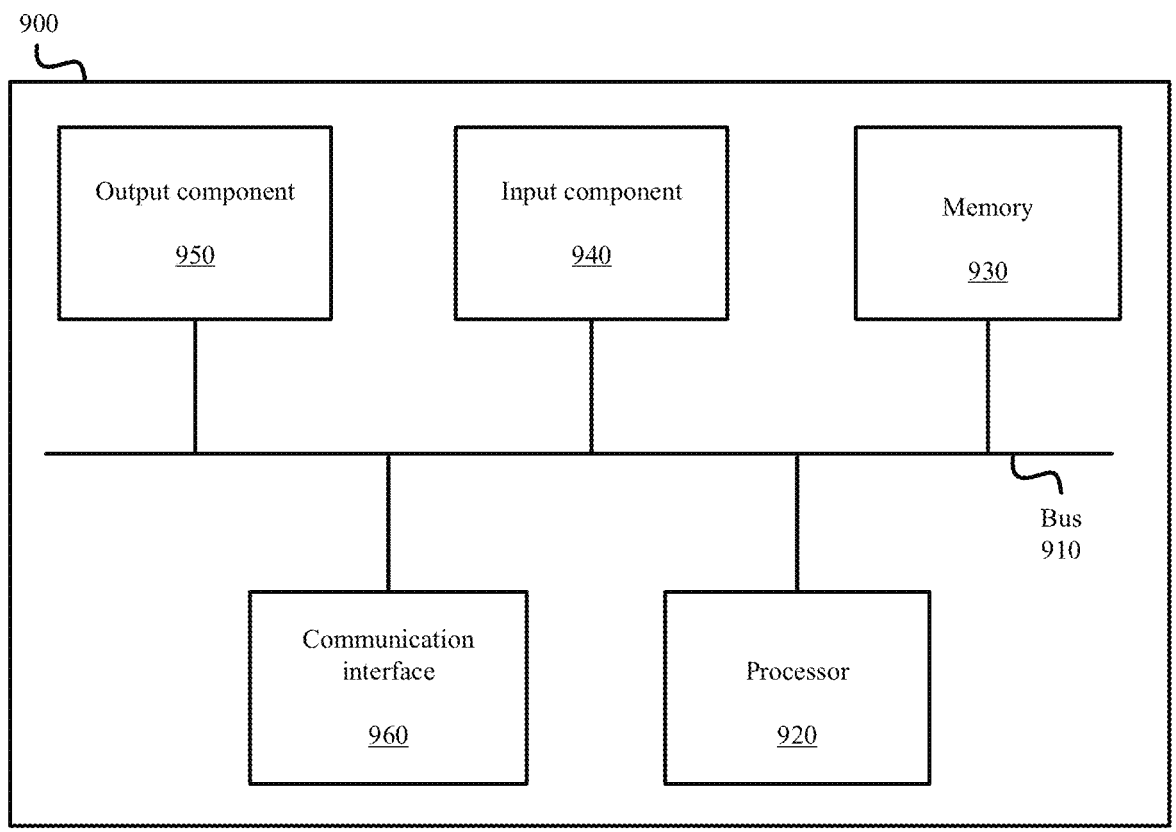
FIG. 9 illustrates example components of one or more devices, according to one or more embodiments described herein.

FIG. 9 is a diagram of example components of device 900. Device 900 may be used to implement one or more of the tools, devices, or systems described above (e.g., optimization system 200, client device 800, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving a point cloud comprising a plurality of points that are distributed across a three-dimensional (3D) space and that generate a 3D model, wherein each point of the plurality of points is defined with a position in the 3D space and a plurality of visual characteristics that are presented at the position;

generating a first optimized splat for a first visual characteristic of the plurality of visual characteristics, wherein generating the first optimized splat comprises replacing a first set of points from the plurality of points with a first replacement primitive based on the first set of points being defined with a first common value for the first visual characteristic, and wherein the first replacement primitive is defined with a first shape that spans the position of each point from the first set of points and with the first common value for the first visual characteristic;

generating a second optimized splat for a second visual characteristic of the plurality of visual characteristics, wherein generating the second optimized splat comprises replacing a second set of points from the plurality of points with a second replacement primitive based on the second set of points being defined with a second common value for the second visual characteristic, and wherein the second replacement primitive is defined with a second shape that spans the position of each point from the second set of points and with the second common value for the second visual characteristic;

generating a third optimized splat for at least a third visual characteristic and a fourth visual characteristic of the plurality of visual characteristics, wherein generating the third optimized splat comprises replacing a third set of points from the plurality of points with a third replacement primitive based on the third set of points being defined with a third common value for the third visual characteristic and a fourth common value for the fourth visual characteristic, and wherein the third replacement primitive is defined with a third shape that spans the position of each point from the third set of points, with the third common value for the third visual characteristic, and with the fourth common value for the fourth visual characteristic; and providing the first optimized splat, the second optimized splat, and the third optimized splat in response to a request to access the point cloud, wherein the first optimized splat, the second optimized splat, and the third optimized splat generate a lossy representation of the 3D model.

2. The method of claim 1 further comprising:

selecting a first view of the point cloud comprising the first set of points, the second set of points, and the third set of points;

selecting a second view of the point cloud comprising a fourth set of points and a fifth set of points from the plurality of points;

generating a fourth optimized splat for the first visual characteristic and the second view, wherein generating the fourth optimized splat comprises replacing the fourth set of points with a fourth replacement primitive based on the fourth set of points being defined with a fifth common value for the first visual characteristic, and wherein the fourth replacement primitive is defined with a fourth shape that spans the position of each point from the fourth set of points and with the fifth common value for the first visual characteristic;

generating a fifth optimized splat for the second visual characteristic and the second view, wherein generating the fifth optimized splat comprises replacing the fifth set of points with a fifth replacement primitive based on the fifth set of points being defined with a sixth common value for the second visual characteristic, and wherein the fifth replacement primitive is defined with a fifth shape that spans the position of each point from the fifth set of points and with the sixth common value for the second visual characteristic; and providing the fourth optimized splat and the fifth optimized splat in response to the request, wherein the first optimized splat, the second optimized splat, and the third optimized splat generate a lossy representation of the 3D model from the first view and the fourth optimized splat and the fifth optimized splat generate a lossy representation of the 3D model from the second view.

3. The method of claim 1, wherein the first shape of the first replacement primitive is an ellipsoidal shape, and wherein the first replacement primitive is defined with coordinates in the 3D space, one or more radii, and the first common value for the first visual characteristic.

4. The method of claim 1 further comprising:

determining a variance with which the first visual characteristic changes across a particular view of the 3D space;

detecting that the variance of the first visual characteristic across the first set of points is below a threshold and that the first set of points are positioned next to each other; and selecting the first set of points for data reduction in response to detecting that the variance of the first visual characteristic across the first set of points is below the threshold.

5. The method of claim 1 further comprising:

determining a fourth set of points that are partially or wholly obscured by a fifth set of points;

removing the fourth set of points; and providing the fifth set of points in response to the request and the fifth set of points being defined with varying values for the first visual characteristic.

6. The method of claim 1 further comprising:

generating a fourth optimized splat for the first visual characteristic by replacing two or more of the first set of points with at least a third replacement primitive with a third shape that spans a different number of the first set of points than the first shape of the first replacement primitive;

determining a first amount of data that is reduced by the first optimized splat and a second amount of data that is reduced by the fourth optimized splat; and selecting the first optimized splat as a reduced encoding for the first visual characteristic in response to the first amount of data that is reduced being greater than the second amount of data that is reduced, wherein selecting the first optimized splat comprises:

retaining the first optimized splat for the reduced encoding of the first visual characteristic; and discarding the fourth optimized splat.

7. The method of claim 1 further comprising:

generating a fourth optimized splat for the first visual characteristic comprising at least one different replacement primitive for the first set of points than the first optimized splat;

computing an amount of loss associated with the first visual characteristic in the first optimized splat and in the fourth optimized splat; and selecting the first optimized splat as a reduced encoding for the first visual characteristic in response to the amount of loss associated with the first visual characteristic in the first optimized splat being less than the amount of loss associated with the first visual characteristic in the fourth optimized splat.

8. The method of claim 7, wherein computing the amount of loss comprises:

generating a first visualization by rendering the first set of points with the first visual characteristic;

generating a second visualization by rendering the first replacement primitive of the first optimized splat;

generating a third visualization by rendering the at least one different replacement primitive of the third optimized splat;

comparing the second visualization and the third visualization to the first visualization; and quantifying the amount of loss based on said comparing of the second visualization and the third visualization to the first visualization.

9. The method of claim 1, wherein the first visual characteristic and the second visual characteristic correspond to a different one of color, roughness, transparency, reflectivity, specular, diffuse, albedo, and index of refraction.

10. The method of claim 1 further comprising:
replacing a fourth set of points from the plurality of points in a same view as the first set of points with a fourth replacement primitive based on the fourth set of points being defined with a fifth common value for the first visual characteristic, and wherein the fourth replacement primitive is defined with a fourth shape that spans the position of each point from the fourth set of points and with the fifth common value for the first visual characteristic.

11. An optimization system comprising:
one or more hardware processors configured to:
receive a point cloud comprising a plurality of points that are distributed across a three-dimensional (3D) space and that generate a 3D model, wherein each point of the plurality of points is defined with a position in the 3D space and a plurality of visual characteristics that are presented at the position;
generate a first optimized splat for a first visual characteristic of the plurality of visual characteristics, wherein generating the first optimized splat comprises replacing a first set of points from the plurality of points with a first replacement primitive based on the first set of points being defined with a first common value for the first visual characteristic, and wherein the first replacement primitive is defined with a first shape that spans the position of each point from the first set of points and with the first common value for the first visual characteristic;
generate a second optimized splat for a second visual characteristic of the plurality of visual characteristics, wherein generating the second optimized splat comprises replacing a second set of points from the plurality of points with a second replacement primitive based on the second set of points being defined with a second common value for the second visual characteristic, and wherein the second replacement primitive is defined with a second shape that spans the position of each point from the second set of points and with the second common value for the second visual characteristic;
generate a third optimized splat for at least a third visual characteristic and a fourth visual characteristic of the plurality of visual characteristics, wherein generating the third optimized splat comprises replacing a third set of points from the plurality of points with a third replacement primitive based on the third set of points being defined with a third common value for the third visual characteristic and a fourth common value for the fourth visual characteristic, and wherein the third replacement primitive is defined with a third shape that spans the position of each point from the third set of points, with the third common value for the third visual characteristic, and with the fourth common value for the fourth visual characteristic; and
provide the first optimized splat, the second optimized splat, and the third optimized splat in response to a request to access the point cloud, wherein the first optimized splat, the second optimized splat, and the third optimized splat generate a lossy representation of the 3D model.

12. The optimization system of claim 11, wherein the one or more hardware processors are further configured to:
select a first view of the point cloud comprising the first set of points, and the second set of points, and the third set of points;
select a second view of the point cloud comprising a fourth set of points and a fifth set of points from the plurality of points;
generate a fourth optimized splat for the first visual characteristic and the second view, wherein generating the fourth optimized splat comprises replacing the fourth set of points with a fourth replacement primitive based on the fourth set of points being defined with a fifth common value for the first visual characteristic, and wherein the fourth replacement primitive is defined with a fourth shape that spans the position of each point from the fourth set of points and with the fifth common value for the first visual characteristic;
generate a fifth optimized splat for the second visual characteristic and the second view, wherein generating the fifth optimized splat comprises replacing the fifth set of points with a fifth replacement primitive based on the fifth set of points being defined with a sixth common value for the second visual characteristic, and wherein the fifth replacement primitive is defined with a fifth shape that spans the position of each point from the fifth set of points and with the sixth common value for the second visual characteristic; and
provide the fourth optimized splat and the fifth optimized splat in response to the request, wherein the first optimized splat, the second optimized splat, and the third optimized splat generate a lossy representation of the 3D model from the first view and the fourth optimized splat and the fifth optimized splat generate a lossy representation of the 3D model from the second view.

13. The optimization system of claim 11, wherein the first shape of the first replacement primitive is an ellipsoidal shape, and wherein the first replacement primitive is defined with coordinates in the 3D space, one or more radii, and the first common value for the first visual characteristic.

14. The optimization system of claim 11, wherein the one or more hardware processors are further configured to:
determine a variance with which the first visual characteristic changes across a particular view of the 3D space;
detect that the variance of the first visual characteristic across the first set of points is below a threshold and that the first set of points are positioned next to each other; and
select the first set of points for data reduction in response to detecting that the variance of the first visual characteristic across the first set of points is below the threshold.

15. The optimization system of claim 11, wherein the one or more hardware processors are further configured to:
determine a fourth set of points that are partially or wholly obscured by a fifth set of points;
remove the fourth set of points; and
retain the fifth set of points in response to the request and the fifth set of points being defined with varying values for the first visual characteristic.

16. The optimization system of claim 11, wherein the one or more hardware processors are further configured to:
generate a fourth optimized splat for the first visual characteristic by replacing two or more of the first set of points with at least a third replacement primitive with a third shape that spans a different number of the first set of points than the first shape of the first replacement primitive;

determine a first amount of data that is reduced by the first optimized splat and a second amount of data that is reduced by the fourth optimized splat; and select the first optimized splat as a reduced encoding for the first visual characteristic in response to the first amount of data that is reduced being greater than the second amount of data that is reduced, wherein selecting the first optimized splat comprises:

retaining the first optimized splat for the reduced encoding of the first visual characteristic; and discarding the fourth optimized splat.

17. The optimization system of claim 11, wherein the one or more hardware processors are further configured to:

generate a fourth optimized splat for the first visual characteristic comprising at least one different replacement primitive for the first set of points than the first optimized splat;

compute an amount of loss associated with the first visual characteristic in the first optimized splat and in the fourth optimized splat; and select the first optimized splat as a reduced encoding for the first visual characteristic in response to the amount of loss associated with the first visual characteristic in the first optimized splat being less than the amount of loss associated with the first visual characteristic in the fourth optimized splat.

18. A method comprising:

receiving a point cloud comprising a plurality of points that are distributed across a three-dimensional (3D) space and that generate a 3D model, wherein each point of the plurality of points is defined with a position in the 3D space and a plurality of visual characteristics that are presented at the position;

generating a first optimized splat for a first visual characteristic of the plurality of visual characteristics, wherein generating the first optimized splat comprises replacing a first set of points from the plurality of points with a first replacement primitive based on the first set of points being defined with a first common value for the first visual characteristic, and wherein the first replacement primitive is defined with a first shape that spans the position of each point from the first set of points and with the first common value for the first visual characteristic;

generating a second optimized splat for a second visual characteristic of the plurality of visual characteristics, wherein generating the second optimized splat comprises replacing a second set of points from the plurality of points with a second replacement primitive based on the second set of points being defined with a second common value for the second visual characteristic, and wherein the second replacement primitive is defined with a second shape that spans the position of each point from the second set of points and with the second common value for the second visual characteristic;

generating a third optimized splat for the first visual characteristic by replacing two or more of the first set of points with at least a third replacement primitive with a third shape that spans a different number of the first set of points than the first shape of the first replacement primitive;

computing an amount of loss associated with the first visual characteristic in the first optimized splat and in the third optimized splat;

selecting the first optimized splat as a reduced encoding for the first visual characteristic in response to the amount of loss associated with the first visual characteristic in the first optimized splat being less than the amount of loss associated with the first visual characteristic in the third optimized splat; and providing the first optimized splat and the second optimized splat in response to a request to access the point cloud, wherein the first optimized splat, and the second optimized splat generate a lossy representation of the 3D model.

19. An optimization system comprising:

one or more hardware processors configured to:

receive a point cloud comprising a plurality of points that are distributed across a three-dimensional (3D) space and that generate a 3D model, wherein each point of the plurality of points is defined with a position in the 3D space and a plurality of visual characteristics that are presented at the position;

generate a first optimized splat for a first visual characteristic of the plurality of visual characteristics, wherein generating the first optimized splat comprises replacing a first set of points from the plurality of points with a first replacement primitive based on the first set of points being defined with a first common value for the first visual characteristic, and wherein the first replacement primitive is defined with a first shape that spans the position of each point from the first set of points and with the first common value for the first visual characteristic;

generate a second optimized splat for a second visual characteristic of the plurality of visual characteristics, wherein generating the second optimized splat comprises replacing a second set of points from the plurality of points with a second replacement primitive based on the second set of points being defined with a second common value for the second visual characteristic, and wherein the second replacement primitive is defined with a second shape that spans the position of each point from the second set of points and with the second common value for the second visual characteristic;

generate a third optimized splat for the first visual characteristic by replacing two or more of the first set of points with at least a third replacement primitive with a third shape that spans a different number of the first set of points than the first shape of the first replacement primitive;

compute an amount of loss associated with the first visual characteristic in the first optimized splat and in the third optimized splat;

select the first optimized splat as a reduced encoding for the first visual characteristic in response to the amount of loss associated with the first visual characteristic in the first optimized splat being less than the amount of loss associated with the first visual characteristic in the third optimized splat; and provide the first optimized splat and the second optimized splat in response to a request to access the point cloud, wherein the first optimized splat and the second optimized splat generate a lossy representation of the 3D model.

* * * * *